3,408,334
PREPARATION OF POLYAMIDES FROM
AROMATIC AMINO COMPOUNDS
John R. Caldwell and Russell Gilkey, Kingsport, Tenn., assignors to Eastman Kodak Company, Rochester, N.Y., a corporation of New Jersey
No Drawing. Filed Apr. 5, 1965, Ser. No. 445,736
16 Claims. (Cl. 260—78)

ABSTRACT OF THE DISCLOSURE

A novel process for the preparation of high molecular weight, fiber- and film-forming polyamides, said process comprising heating organic compounds containing carboxyl groups and aromatic amino groups as the sole reactive groups (for example, dicarboxylic acids, aromatic diamines, and aromatic amino acids) in the presence of a tin compound (for example, dibutyl tin oxide, dibutyl tin diacetate, and tin tetrabutoxide).

---

This invention relates to a novel process for the production of linear polyamides from aromatic amino compounds such as aromatic diamines, that is, compounds in which the amino groups are attached directly to an aromatic ring system, or aromatic amino acids, that is, an amino acid in which the amino group is attached directly to an aromatic ring system. More particularly, the invention relates to the preparation from such reactants of high molecular weight, long chain linear polyamides of high inherent viscosity, high melting point and other physical properties which particularly fit them for use in the production of fibers, films, sheets and other shaped plastic products.

From the earlier work of Carothers on nylon it is known that if one reacts a dibasic acid such as adipic with a diamine such as hexamethylenediamine, a polyamide is formed and water is split out. The equation for this reaction is as follows:

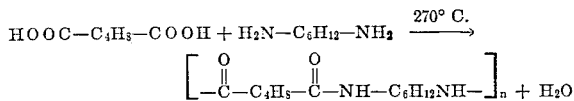

A plurality of polyamide repeat units of the above equation are formed by connecting the carboxyl portion of one unit with the amine portion of another unit and so on until the desired molecular weight is attained. It is also known that polyamides may be prepared by reacting various aromatic diamines with various free dicarboxylic acids or esters of such dicarboxylic acids at temperatures up to 300° C. or higher in the presence of a catalyst. For example, U.S. Patent 2,244,192 to Flory describes the use of phosphoric and/or sulfuric acids as catalyst. It has been found that these acid catalysts do not give polymers suitable for practical use because of the fact that side reactions occur and linear high molecular weight polymers are not obtained.

The use of litharge (PbO) has also been suggested for this purpose in U.S. Patent 2,669,556. While this compound has a slight activity as a catalyst for the abovementioned reaction between aromatic diamines and free dicarboxylic acids or esters thereof, the reaction rate is extremely slow and undesirably colored products are obtained on long heating. As pointed out in this disclosure, if no catalyst is employed, one obtains low molecular weight polymers in a total reaction time of two or three hours and on prolonged heating cross-linked polymers which are difficult or impossible to process, because of non-uniform melt flow, are obtained. As will be more fully set forth hereinafter the particular catalysts employed in the present invention have been found to be much more effective than litharge or other lead compounds when employed for this purpose.

It has also been established in the art to which the present invention relates that aromatic diamines are much less reactive toward dicarboxylic acids than are aliphatic diamines. So far as we are aware no process has been described in the patent or technical literature for the production of useful polyamides in a reasonable length of time, say, a total reaction time of two or three hours, by reacting aromatic diamines with dicarboxylic acids. Furthermore, in order to have practical utility as a fiber, sheet or film-forming material or as a plastic product, a polyamide must have little or no color, it must have a linear structure (that is no cross-linked structure should be present in the molecule) and must have an inherent viscosity of the order of 0.8 or higher.

The inherent viscosity of various polymers as used herein may be defined as a measure of the degree of polymerization of a polymeric compound and is calculated from the equation:

$$\{\eta\} = \frac{In\eta_\mathrm{r}}{C}$$

wherein $\eta_\mathrm{r}$ is the ratio of the viscosity of a dilute (approximately .25 percent by weight) solution of the polymer in a solvent composed of 60 percent by weight of phenol and 40 percent by weight of tetrachloroethane to the viscosity of the solvent itself, and C is the concentration of the polymer in grams per 100 cubic centimeters of the solution.

The determination of inherent viscosity as described above uses a mixture of phenol and tetrachloroethane as the solvent for the polymer. In some cases, the polyamide will not be soluble in this particular solvent. For instance, it may be necessary to use concentrated sulfuric acid or dimethylformamide containing about 5 to 8 percent lithium chloride, calcium nitrate or some other salt. Regardless of the solvent used, the calculation of the inherent viscosity is carried out as described above. It is to be understood that when the term "inherent viscosity" is used, it is implied that an appropriate solvent was employed for the particular polyamide under discussion.

At the present time the only method known for production of commercial polyamides from aromatic diamines is by reaction with an acid chloride. This so called "interfacial" method is described in Belgian Patents 565,-266, 565,267 and 565,268; British Patent 871,580 and U.S. Patent 3,006,899. Such a product made from isophthaloyl chloride and m-phenylene diamine is marketed by E. I. du Pont de Nemours and Company under the trademark Nomex. Since the acid chlorides are very expensive to manufacture, the interfacial process is feasible only for the production of special items that command a premium price. In contrast and as will be more fully set forth hereinafter, the process of the present invention employs the free acid and, in its major aspects, our improved process is comparable, as to reaction conditions, to current nylon technology. In fact, essentially the same equipment now being used for commercial nylon production can be employed in the present invention.

The present invention has as its principal object to provide a novel and highly efficient process for the production of high molecular weight, long chain, linear polyamides of high inherent viscosity, melting point and other physical properties which fit them for use in the production of fibers, films, sheets and other shaped plastic products.

Another object is to provide an improved process involving the use of a novel catalyst which materially shortens the time of reaction between the required aromatic amino compound and the acid with which it is reacted to produce the high molecular weight, linear polymer of the desired inherent viscosity, melting point and other physical properties as compared to the time required to obtain a comparable polyamide polymer by known methods.

A further object is to provide a new and improved catalytic process for the manufacture of linear fiber- and film-forming polyamides from either aromatic diamines and dicarboxylic acids or aromatic amino acids.

A specific object of the invention is to provide a new catalyst for promoting the reaction between aromatic diamines and free dicarboxylic acids or the reaction of aromatic amino acids.

Other objects will appear hereinafter.

These objects are accomplished by the following invention which comprises heating substantially equimolar amounts of an aromatic diamine and a dicarboxylic acid at a temperature within the range of 200–350° C. in the presence of from about 0.005 percent to about 2.0 percent of a tin compound as catalyst. The tin catalyst may be an organo-metallic tin compound, that is, it contains at least one organic carbon to tin bond. The carbon atom participating in the bond can be present in an alkyl or aryl group. The organo-metallic tin compound may have one or more valences satisfied by an electronegative radical such as oxygen, sulfur, carboxylate, alkoxide, sulfoxylate, hydroxide, halogen, etc. It will be understood that the term "electro-negative radical" refers to any element or radical which bears a negative charge. The organo-metallic tin compound may have one or more valences satisfied by another substituted tin radical such as alkyl tin. The organo-metallic tin compounds which have been found to be effective in our process are those described in Caldwell U.S. Patent 2,720,507. An additional disclosure of such organo metallic tin catalysts and methods of preparation is to be found in Encyclopedia of Chemical Technology, 2nd supplement volume, by R. E. Kirk and D. F. Othmer (1960), pp. 523–548, published by Interscience Encyclopedia, Inc. New York, N.Y.

Another useful class of catalysts is represented by tin dialkoxides and tetraalkoxides. These compounds are described in U.S. Patent No. 2,720,507. Other useful catalysts are tin compounds in which all of the valences are satisfied by carboxylate groups.

Of the above described tin compounds those which are soluble in the aromatic diamine-dicarboxylic acid reaction medium and derivable from either di- or tetra-valent tin, such as those tin compounds which are the carboxylic acid salts, alkyl and aryl derivatives and compounds of tin containing both organic and inorganic radicals attached to tin and exemplified by such compounds as dibutyl diphenyl tin, tetraphenyl tin, dibutyl tin diacetate, tin octanoate, tin salicylate, dibutyl tin dibutoxide, dibutyl tin oxide, bis(tributyl tin) oxide, dibutyl tin dilaurate, triphenyl tin hydroxide, stannous oxalate, diethyltin dibenzoate, trihexyltin adipate, tin tetrabutoxide, dibutyl tin dichloride, and the like are especially valuable. We have found that these tin compounds when used as catalysts for the reaction between an aromatic diamine and a dicarboxylic acid are unique in their ability to accelerate this reaction and to produce high molecular weight, long chain, linear polyamides of high inherent viscosity and excellent color in reasonably short periods of time.

In like manner an aromatic amino acid may be reacted with itself in the presence of tin catalysts of the type just described and within the same reaction temperature range.

Also in like manner, a mixture of an aromatic diamine, a dicarboxylic acid and an aromatic amino acid may be reacted in the presence of tin catalysts of the type just described and within the same reaction temperature range. Mixtures of one or more aromatic amino acids and/or, one or more of the aromatic diamines and dicarboxylic acids may be used under substantially the same reaction conditions. Proceeding in this manner linear polyamides and copolyamides having excellent color and a molecular weight of 10,000 or more are thus readily obtained by our improved process. Polymers and copolymers having a melting point of 200° C. or higher and an inherent viscosity of at least 0.8 and in general much higher are obtained by our process.

As explained above and in accordance with our invention, polyamides of the desired properties may be produced by reacting organic compounds containing carboxyl groups, such as a dicarboxylic acid, with an aromatic diamine. In accordance with a preferred embodiment of our invention, essentially equivalent amounts of these reactants are employed. Such a reaction involves a two component system, that is, for example the reaction between a dicarboxylic acid and an aromatic diamine. As indicated above, and as further illustrated by the examples which follow, our invention is equally applicable to the production of polyamides by the employment of a three component system as, for example, equivalent amounts of a dicarboxylic acid and an aromatic diamine together with an aromatic amino acid. In such a case the amount of the aromatic amino acid may range from 1–99 mole percent of total reactive amino and carboxylic acid groups.

Polyamides made from aromatic diamines and aromatic dicarboxylic acids or aromatic amino acids are of particular value for use in the manufacture of fibers, films, and molded objects because of their high melting points, high modulus of elasticity and excellent stability in air at temperatures of 150° C. or higher.

It should be emphasized that the term "aromatic diamines" as used herein signifies a compound in which the amino groups are attached directly to an aromatic ring system. The term "aromatic amino acid" as used herein also signifies a compound in which the amino group is attached directly to an aromatic ring system.

As to the dicarboxylic acids which may be used in accordance with our invention, and dicarboxylic acid such as those commonly employed in the art for the production of linear polyamides may be employed. Such acids are characterized by certain structural features. For example, the aliphatic dicarboxylic acids should contain at least 4 carbon atoms between the carboxyl groups. The aromatic acids contain at least 3 carbon atoms between the carboxyl groups. A wide range of alicyclic acids can be used provided that they contain at least 3 carbon atoms between the carboxyl groups.

Typical aliphatic dicarboxylic acids may be represented by the structural formula $HOOC(CH_2)_nCOOH$ wherein $n$ is 4 to 18. Branched chain acids may also be used such as 2- and 3-methyladipic, 2-ethyladipic, trimethyladipic, dimethyladipic, 3-ethylsebacic, 3-butylsuberic and 3-cyclohexylsebacic.

Typical aromatic dicarboxylic acids are isophthalic, 4-methylisophthalic, 5-tert-butylisophthalic, terephthalic, 2 - methylterephthalic, the isomeric naphthalenedicarboxylic acids, etc. The carboxyl groups may be on different aromatic nuclei that are joined by a direct bond or by a divalent radical such as:

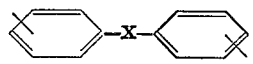

where X is a direct bond, $-CH_2-$, $-(CH_2)_2-$, $-CH(CH_3)-$, $-CH(C_2H_5)-$, $-C(CH_3)_2-$, $-O-$, $-O-CH_2-$, $-O-(CH_2)_2-O-$, $-O-(CH_2)_4-O-$, $-S-$, and $-SO_2-$.

Suitable alicyclic dicarboxylic acids include 1,4-cyclohexanedicarboxylic acid, 2,5 - norcamphanedicarboxylic acid, 4,4′-dodecahydrodiphenic acid, 1,3-cyclopentanedicarboxylic acid and pinic acid.

Other types of alicyclic acids include structures such as

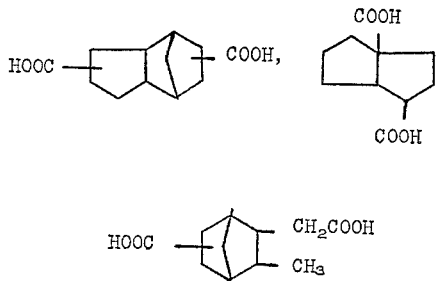

Dicarboxylic acids containing one or more ether groups can be employed such as p-phenylenedioxydiacetic acid and similar compounds described in Makromolecular Chem., 32, 1 (1959).

Mixtures of two or more dicarboxylic acids can be used as, for example, a mixture of isophthalic and terephthalic acid. In particular, mixtures of an aliphatic acid with an aromatic acid are of value. Examples of useful combinations of this type are a mixture of isophthalic acid and adipic acid and a mixture of sebacic acid and terephthalic acid. Mixtures of an aromatic acid with an alicyclic acid or an aliphatic acid with an alicyclic acid also are of value in practicing the invention.

As to the aromatic diamines which can be employed in our invention, in general any diamine which contains at least 3 carbon atoms between the amino groups can be used. Typical examples of suitable diamines are m-phenylenediamine, p - phenylenediamine, 2,4 - diaminotoluene, isomeric diaminoxylene, etc. Naphthalenediamine are also useful. Likewise, compounds such as benzidine, 4,4-methylenedianiline, and 3,4′-diaminodiphenyl can be employed. Other useful diamino compounds are listed in Belgian Patents 565,266–8; British Patent 871,580 and U.S. Patent 3,006,899.

The aromatic diamines may contain one or more substituents on the aromatic ring. These substituents may be selected from the classes consisting of halogen such as chlorine and bromine; straight and branched chain alkyl radicals containing from one to 12 carbon atoms; aryl radicals containing from 6–10 carbon atoms; and alkylene aryl radicals and alkylated arylene radicals.

Aromatic amino acids that contain an amino group on an aromatic ring structure can be used. The carboxyl group may be attached to the aromatic ring or it may be separated from the aromatic ring by an alkylene group, a cycloalkylene group or an alkyleneoxy group. If the carboxyl group and amino group are present on the same aromatic ring, they should preferably be in m- or p-positions with respect to each other, as the o-amino acids tend to be less stable. The aromatic nucleus may be derived from benzene or a condensed polycyclic aromatic system such as naphthalene, phenanthrene, etc. The aromatic ring may contain substituents such as lower alkyl, phenyl and halogen. A particularly useful class of aromatic amino acids has the general structure:

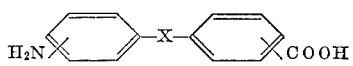

X has the structure given above.

Suitable aromatic amino acids are represented by the following: m- and p-aminobenzoic acid, 3-amino-4-methylbenzoic acid, 3-amino-5-chlorobenzoic acid, (4-aminophenoxy)acetic acid, (3-aminophenoxy)acetic acid, 3-(4-aminophenyl)propionic acid, 4′-amino-3-carboxyldiphenyl ether, 4′ - amino - 4 - carboxydiphenyl, 4 - (4 - aminophenoxy)butyric acid and 4′-carboxy-4-aminodiphenylmethane.

Aromatic amino acids that contain the naphthalene nucleus are represented by: 1-carboxy-3-aminonaphthalene, 2-carboxy-6-amino-naphthalene, 2-carboxy-7-amino naphthalene and (5-amino-1-naphthyloxy)acetic acid.

Polyamides may be made by heating the amino acids with the tin catalysts. Mixtures of two or more amino acids may be used. In a preferred embodiment of the invention, copolyamides are made by heating a mixture of the aromatic amino acid, an aromatic diamine and a dicarboxylic acid in the presence of a tin catalyst. The aromatic amino acid may be present as a major or minor constituent in the copolyamide.

Reference has been made above to the preparation of polyamides in accordance with our invention. More specifically, these compounds may be prepared by heating the dicarboxylic acid and the diamine in substantially equimolar amounts at a temperature of 200°–350°, in the presence of the tin catalyst. An inert atmosphere must be employed. Agitation is employed in order to facilitate the removal of water from the viscous melt. Vacuum is advantageously used in the latter stages of the reaction.

In one embodiment of the invention, a salt of the dicarboxylic acid and diamine is heated in a purged, sealed vessel at a temperature of 250°–300° for 30 minutes to 3 hours in order to make a prepolymer. The tin catalyst is present during the reaction. This prepolymer is then built up to a high molecular weight by stirring the melt in vacuum. Alternatively, the prepolymer may be granulated to a particle size of 0.03 in. or smaller and heated in a vacuum or in an inert atmosphere at a temperature somewhat below the melting point. The salts are made by heating substantially equimolar amounts of the acid and diamine in aqueous alcohol or dioxane. The tin catalyst can be added at this time. An intimate mixture of the salt and catalyst is obtained by evaporating the solvent.

The polyamides can also be made in solvents such as cresol, o-hydroxydiphenyl, etc. An inert nonsolvent can be used as a heat-transfer medium, as represented by terphenyl, chlorinated diphenyl and chlorinated or alkylated naphthalenes.

Copolymers can be made by using mixtures of aromatic diamines and aliphatic diamines. The polyamides can be modified by copolymerization with amino acids such as caprolactam and 12-aminododecanoic acid.

In general the polyamides made from aromatic diamines by the process described above are characterized by melting points of about 250° C. or higher and by extreme thermal stability. The properties of this general class of polyamides is described in considerable detail in the prior art patents cited above.

As previously indicated, the efficacy of our process in enabling one to obtain high molecular weight, long chain, linear polyamides of high inherent viscosity, high melting points and other physical properties which particularly fit them for use in the production of fibers, films, sheets and other shaped plastic products at reaction times and with the employment of the usual equipment used for commercial nylon production, is dependent upon the use, in accordance with the present invention, of tin catalysts of the type described above. These tin catalysts greatly increase the reaction rate between aromatic diamines and free dicarboxylic acids. In fact, the reaction rate is essentially the same as that attained in commercial nylon production by reacting aliphatic diamines with aliphatic dicarboxylic acids. This is a very important and unpredictable discovery and rendered even more so when one takes into consideration the fact that although it was well known to react aliphatic diamines with dicarboxylic acids to produce nylon type polymers, no one has, until the advent of the present invention, been able to react aromatic diamines with dicarboxylic acids to obtain polymers of fiber- and film-forming properties and suitable for use in commercial production of fibers, films and other plastic products. By practicing our invention as described herein, characterized by the employment of these novel tin catalysts, not only is one enabled to carry out the polymer forming process at relatively high reaction rates, but also obtain a polymer product which has excellent color and, because of its high inherent viscosity, melting point and linear molecular structure and other properties, can readily be fabricated into products of excellent quality by the usual processes of spinning, film and sheet forming, molding and the like.

In the following examples and description, we have set forth several of the preferred embodiments of our invention; but they are included merely for purposes of illustration and not as a limitation thereof.

EXAMPLE I

The following reproducible, standard procedure was used to test the effectiveness of various catalysts in promoting the polymerization of dicarboxylic acids with aromatic diamines: A 100 ml. round-bottom glass flask was charged with 4.95 g. (0.025 mole) of 4,4'-methylenedianiline, 5.75 g. (0.025 mole) of 1, 12-dodecanedicarboxylic acid, 10 ml. of tetralin, 10 g. of o-terphenyl, and an amount of catalyst such that the metal content constituted 0.223 percent by weight of the combined weight of acid and diamine. In the case of dibutyl tin oxide this amounted to 0.05 g. dibutyl tin oxide. The flask and its contents were placed in a metal bath which was heated from 150° to 265° C. The reaction mixture was protected from air by a nitrogen sweep. The mixture was stirred constantly. The diamine and dicarboxylic acid started reacting around 180°C. At 265° C. tetralin distilled from the flask to carry out the remaining major portion of water which had not already distilled. The temperature of the bath was then raised to 280° C. and held for 3 hours. As the polymer increased in viscosity, it separated from solution in the o-terphenyl to form a viscous, solvent-swollen, second phase. It solidified on cooling and was washed with benzene to remove the o-terphenyl. It was then ground to a particle size of less than 0.03 in. and extracted with benzene in a Soxhlet extractor to complete the removal of o-terphenyl. The inherent viscosities of polymers prepared in this manner using different catalysts are shown in the following table:

| Catalyst | Amount Catalyst Used, g. | Polymer Inherent Viscosity [1] |
|---|---|---|
| None | None | 0.38, 0.37 |
| Dibutyl tin oxide | 0.05 | 1.28, 1.13 |
| Do | 0.01 | 0.96 |
| Dibutyl diphenyl tin | 0.078 | 1.24 |
| Triphenyl tin hydroxide | 0.074 | 1.08 |
| Dibutyl tin diacetate | 0.07 | 1.27 |
| Dibutyl tin dilaurate | 0.127 | 1.16 |
| Bis (tributyl tin) oxide | 0.06 | 1.23 |
| Tin salicylate | 0.079 | 1.19 |
| Lead monoxide | [2] 0.05 | 0.66 |

[1] Inherent viscosities were determined in 60–40 phenoltetrachloroethane.
[2] This is 0.45 percent lead based on the combined weight of diacid and diamine.

Low-viscosity or low-molecular weight polymers were formed even in the absence of catalyst. Litharge (lead monoxide) produced a higher viscosity polymer than the control showing that it did have some catalytic activity. The tin catalysts, however, were much more active than litharge in producing high viscosity polymers.

EXAMPLE II

A 100 ml. round-bottom glass flask was charged with 4.95 g. (0.025 mole) of 4,4'-methylenedianiline, 5.75 g. (0.025 mole) of 1,12-dodecanedicarboxylic acid, and 0.01 g. of dibutyl tin oxide. The flask was fitted with a stirrer, provision for maintaining a nitrogen atmosphere over the reaction mixture, and provision for applying reduced pressure. It was heated at 220° C. until the reactants had melted and started reacting to eliminate water. The heating bath was raised in about 15 minutes to 280° C. Heating at 280° C. with stirring under an atmosphere of nitrogen was continued for 30 minutes. At this point the polymer melt was quite viscous. The pressure was reduced to about 0.05 mm. Hg over a period of a few minutes. After stirring the polymer under vacuum at 280° C. for 30 minutes, it had wrapped around the stirrer. It was cooled under vacuum and removed from the flask. This polymer had an inherent viscosity of 1.14. The color of the polymer was light cream. The crystalline melting point, as determined by differential thermal analysis was 268° C.

EXAMPLE III

A polymer was prepared from sebacic acid and 4,4'-methylenedianiline by the procedure in Example II. The final temperature in the preparation was 295° C. instead of 280° C. The inherent viscosity of the polymer was 0.86 and the melting point by differential thermal analysis was 280° C.

EXAMPLE IV

A 100 ml. round-bottom glass flask was charged with 3.32 g. (0.02 mole) of isophthalic acid, 3.48 g. (0.02 mole) of suberic acid and 20 ml. of pyridine. The mixture was heated to effect solution. To the solution was added 7.92 g. (0.04 mole) of 4,4'-methylenedianiline and 0.01 g. dibutyl tin oxide. The mixture was heated with stirring in an atmosphere of nitrogen starting at 120° C. The temperature of the heating bath was increased to 260° over a period of 45 minutes. The pyridine distilled between 120 and 200°. The melt was hazy initially after the pyridine distilled but cleared up at 260° C. After stirring for 30 minutes at 260° C., the pressure was reduced to 0.08 mm. Hg. The polymer wrapped around the stirrer in 20 minutes. It was cooled under vacuum and then removed from the flask. The inherent viscosity of the polymer, as measured in cold concentrated sulfuric acid, was 0.84.

EXAMPLE V

A glass tube made to fit inside a stainless steel autoclave with 300 ml. capacity was charged with 11.88 g. of 4,4'-methylenedianiline, 13.8 g. of 1,12-dodecanedicarboxylic acid, and 0.02 g. dibutyl tin oxide. The contents of the tube were melted and blended into a homogeneous solution while maintaining an atmosphere of nitrogen over the melt. The tube was placed in the autoclave which was then purged 10 times with 500 p.s.i. nitrogen. The autoclave and contents were then heated to 265° C. The pressure inside the autoclave was maintained at 60–75 p.s.i. by bleeding off steam as it formed. Heating was continued at 265° C. for 1.5 hours. The autoclave was allowed to cool to room temperature. The white prepolymer obtained was ground to pass a 20 mesh screen. It was built up to an inherent viscosity of 1.03 by heating the particles at 230° C. for 3 hours under 0.05 mm. Hg pressure.

EXAMPLE VI

Using the procedure described in Example II and dibutyl tin diacetate as the catalyst, a copolyamide was prepared from equal moles of (adipic acid plus 4,4'-methylenedianiline) and ε-caprolactam. This polymer melted at 279° C. and had an inherent viscosity of 0.93. It is useful as a fiber and molding plastic.

EXAMPLE VII

Using the procedure described in Example II, polyamides were prepared from 4,4'-methylenedianiline and 1,12-dodecanedicarboxylic acid with either lead monoxide as catalyst or with no catalyst. The inherent viscosities of the polyamides were 0.39 and 0.43, respectively. This experiment again shows how much more effective the tin catalyst is than litharge or no catalyst in promoting the condensation of aromatic amines with carboxylic acids.

EXAMPLE VIII

A copolyamide was prepared from 3,3'-dimethyl-4,4'-methylenedianiline and a 1/1 molar ratio of terephthalic acid/suberic acid by the procedure described in Example IV using dibutyl diphenyl tin as catalyst. This copolyamide had an inherent viscosity of 0.87 and softened above 300° C.

EXAMPLE IX

The following polyamides are prepared using tin catalysts:

| Acid Constituent (molar ratio) | Amine Constituent (molar ratio) | Catalyst | I.V. | M.P., ° C.[1] |
|---|---|---|---|---|
| 1. Suberic acid | 4/1 4,4'-methylenedianiline/ 1,4-cyclo-hexanebis(methyl-amine). | Dibutyl tin oxide | 0.94 | 285 |
| 2. 3/1 betamethyl adipic acid/adipic acid. | 4,4'-methylenedianiline | Dibutyl tin diacetate | 0.89 | 279 |
| 3. 3/1 suberic acid/isophthalic acid. | 4,4'-methylenedianiline | Dibutyl diphenyl tin | 0.79 | 235 |
| 4. Adipic acid | 1/1 4,4'-methylenedianiline/ 2,4-toluenediamine. | Tin octanoate | 0.85 | 195 |
| 5. Suberic acid | 3,3'-dimethyl-4,4'-methylene-dianiline. | Dibutyl tin oxide | 0.95 | 275 |
| 6. Suberic acid | 3/1 4,4'-methylenedianiline/ m-phenylenediamine. | ...do... | 0.91 | 295 |
| 7. Isophthalic acid | 4/1 m-phenylenediamine/4,4'-methylenedianiline. | Triphenyl tin hydroxide | 0.88 | 310 |
| 8. 4,4'-methylenedibenzoic acid. | 4,4'-methylenedianiline | Tetraphenyl tin | 0.94 | 339 |
| 9. 2,6-naphthalenedicarboxylic acid. | 4,4'-isopropylidenedianiline | Bis(tributyl tin) oxide | 0.84 | >300 |

[1] The temperature at which small particles of polymer sealed in a capillary tube under nitrogen begin to flow when heated on the hot stage of a microscope.

These polymers are useful in applications involving the manufacture of film, fiber, molded plastics and other shaped objects.

EXAMPLE X

One molecular proportion of 4,4'-methylenedibenzoic acid and one molecular proportion of 3,3'-dimethyl-4,4'-methylenedianiline are heated in dioxane containing 10–15 percent water until a clear solution having a solids content of about 8–10 percent is obtained. Dibutyl tin diacetate is added, using 0.02 percent based on the weight of the salt and the solvent is evaporated in vacuum. The salt is placed in an autoclave and purged with nitrogen several times. It is then heated at 260–270° for 1.5 hours. The resulting prepolymer is ground to a particle size of 0.02 in. and is heated in vacuum at 270–280° for 2 hours. The polyamide has a high inherent viscosity as measured in dimethylformamide containing 5 percent lithium chloride. Fibers are spun from a solution in this solvent. They soften above 300° C.

EXAMPLE XI

Using the general procedure described above and tin tetrabutoxide catalyst, a polyamide is made from isophthalic acid and m-phenylenediamine. It is useful for the production of fibers. The amount of catalyst used was 0.005 percent based on the reactants.

EXAMPLE XII

Using the general procedure described above and stannous oxalate catalyst, a polymer is made from isophthalic acid and 2,4-diaminotoluene. The amount of catalyst used was 2 percent based on the reactants.

EXAMPLE XIII

Using diphenyltin dilaurate as catalyst, a polyamide is made from 5-tert-butylisophthalic acid and 4,4'-diaminodiphenylether. It is useful as a fiber.

EXAMPLE XIV

Using $(C_2H_5)_3Sn-O-Sn(C_2H_5)_3$ as catalyst, a polyamide is made from 2-methylterephthalic acid and 2,4-diaminotoluene. It is useful for the production of fibers, films and molded objects.

EXAMPLE XV

A 100-ml. flask is charged with 4.95 g. (0.025 mole) of 4,4'-methylenedianiline, 5.75 g. (0.025 mole) of sebacic acid and 1.37 g. (0.010 mole) of m-aminobenzoic acid. Dibutyltin oxide (0.01 g.) is added as catalyst. A polymer is made using the general procedure described in Example II. The polymer softens at a temperature of 255–270° and tends to be noncrystalline. It gives transparent objects when molded.

EXAMPLE XVI

Using the general method described above and $MgSn(OC_2H_5)_4$ catalyst, a copolyamide is prepared from 1 mole of isophthalic acid, 1 mole of 3,3'-diamino-4,4'-dimethyldiphenylmethane and 0.5 mole of 3'-amino-4-carboxydiphenylmethane.

EXAMPLE XVII

One hundred grams of (4-aminophenoxy) acetic acid and 0.1 g. of dibutyl diphenyltin are stirred in a nitrogen atmosphere at 200° for 1 hr., at 240° for 1 hr. and then at 280–300° for 30 minutes in a vacuum of 0.1 mm. A highly viscous melt is obtained. Other suitable catalysts for the reaction include trihexyltin acetate and dibutyltin sulfide.

EXAMPLE XVIII

When the tin catalysts are employed, an excess of ether the acid or the aromatic amino compound may be present in the initial reaction mixture. For instance, a starting ratio of 1.0 mole dicarboxylic acid and 1.05–1.10 moles of aromatic diamine can be used. Under the influence of the tin catalyst, the excess diamine is eliminated during the polymerization stage and a high viscosity polymer, containing only amino end groups, is obtained. In a similar manner, a ratio of 1.0 mole aromatic diamine and about 1.05 moles of dicarboxylic acid can be used to produce a polyamide that is terminated with carboxyl groups. The process is illustrated below.

A mixture of 5.35 g. (0.027 mole) of 4,4'-methylenedianiline, 5.75 g. (0.025 mole) of 1,12-dodecanedicarboxylic acid and 0.01 g. of dibutyltin oxide was treated according to the procedure of Example II. The excess diamine was removed at the vacuum stage and a polyamide having an inherent viscosity of 1.03 was obtained.

A mixture of 4.95 g. (0.025 mole) of 4,4'-methylenedianiline, 6.00 g. (0.026 mole) of 1,12-dodecanedicarboxylic acid and 0.01 g. of dibutyltin oxide was treated according to the procedure of Example II. The excess dicarboxylic acid was removed at the vacuum stage to form a polyamide having an inherent viscosity of 1.1.

From the above examples and description it will be readily seen that by our invention we have provided a unique and highly efficient process for the production of high molecular weight, long chain, linear polyamides of high inherent viscosity, high melting point, excellent color, absence of cross-linking and possessing other physical and chemical properties which particularly fit them for use in the production of fibers, films, sheets and other shaped plastic products. In particular and as pointed out above, the use of the tin catalysts of the present invention greatly increases the reaction rate between the reacting materials, as for example, aromatic diamines and free dicarboxylic acids. As indicated the reaction rate is essentially the same as that attained in commercial nylon production by reacting aliphatic diamines with aliphatic dicarboxylic acids. This is an important and entirely unpredictable discovery and enables polyamides of the type in question to be produced at commercially feasible reaction rates and employing essentially the same equipment now being used for commercial nylon production to give products possessing excellent physical properties and excellent color which enable them to be readily fabricated into fibers, films and various molded plastic products by standard and well-known processing techniques. Many other advantages will be apparent to those skilled in the art to which this invention relates.

Although the invention has been described in considerable detail with particular reference to certain preferred embodiments thereof, variations and modifications can be effected within the spirit and scope of the invention as described hereinabove, and as defined in the appended claims.

We claim:

1. An improved process for preparing a highly polymeric linear polyamide having improved color and an inherent viscosity of at least 0.6 which comprises heating at an elevated temperature within the range of 200 to 350° C. in an inert atmosphere including a vacuum, organic compounds containing carboxyl groups and aromatic amino groups as the sole reactive groups, said carboxyl groups and aromatic amino groups being present in essentially equivalent amounts and said organic compounds being selected from the class consisting of dicarboxylic acids, aromatic diamines, and aromatic amino acids, in the presence of from 0.005 to 2 percent, based on the weight of the reaction mixture, of a tin compound as the sole catalytic agent, said tin compound being selected from the group consisting of (a) organo-metallic tin compounds containing at least one carbon to tin bond, the other valences of the tin being satisfied by one or more bonds attached to carbon, oxygen, sulfur, or halogen and (b) tin compounds in which all valences of the tin are satisfied by —O— bonds wherein the —O— linkage is part of a carboxyl or alkoxide group.

2. An improved process for preparing a highly polymeric linear polyamide having improved color and an inherent viscosity of at least 0.6 which comprises heating at an elevated temperature within the range of 200 to 350° C. in an inert atmosphere including a vacuum, essentially equivalent amounts of at least one dicarboxylic acid with at least one aromatic diamine, in the presence of from 0.005 to 2 percent, based on the weight of the reaction mixture, of a tin compound as the sole catalytic agent, said tin compound being selected from the group consisting of (a) organo-metallic tin compounds containing at least one carbon to tin bond, the other valences of the tin being satisfied by one or more bonds attached to carbon, oxygen, sulfur, or halogen and (b) tin compounds in which all valences of the tin are satisfied by —O— bonds wherein the —O— linkage is part of a carboxyl or alkoxide group.

3. The process of claim 2 in which the dicarboxylic acid compound contains from 6 to 40 carbon atoms and is selected from the group consisting of aliphatic dicarboxylic acids containing at least 4 carbon atoms between the carboxyl groups, aromatic dicarboxylic acids containing at least 3 carbon atoms between the carboxyl groups and alicylic dicarboxylic acids containing at least 3 carbon atoms between the carboxy groups and in which the aromatic diamine contains at least 3 carbon atoms between the amino groups.

4. An improved process for preparing a highly polymeric linear polyamide having improved color and an inherent viscosity of at least 0.6 which comprises heating at an elevated temperature within the range of 200 to 350° C. in an inert atmosphere including a vacuum, at least one aromatic amino acid in the presence of from 0.005 to 2 percent, based on the weight of the aromatic amino acid, of a tin compound as the sole catalytic agent, said tin compound being selected from the group consisting of (a) organo-metallic tin compounds containing at least one carbon to tin bond, the other valences of the tin being satisfied by one or more bonds attached to carbon, oxygen, sulfur, or halogen and (b) tin compounds in which all valences of the tin are satisfied by —O— bonds wherein the —O— linkage is part of a carboxyl or alkoxide group.

5. An improved process for preparing a highly polymeric linear polymeric having improved color and an inherent viscosity of at least 0.6 which comprises heating at an elevated temperature within the range of 200 to 350° C. in an inert atmosphere including a vacuum, essentially equivalent amounts of at least one dicarboxylic acid and at least one aromatic diamine with at least one aromatic amino acid, in the presence of from 0.005 to 2 percent, based on the weight of the reaction mixture, of a tin compound as the sole catalytic agent, said tin compound being selected from the group consisting of (a) organo-metallic tin compounds containing at least one carbon to tin bond, the other valences of the tin being satisfied by one or more bonds attached to carbon, oxygen, sulfur, or halogen and (b) tin compounds in which all valences of the tin are satisfied by —O— bonds wherein the —O— linkage is part of a carboxylic or alkoxide group.

6. The process of claim 1 in which the organo-tin compound is selected from the group consisting of di- and tetra-valent organo metallic compounds of tin in which the several valences are satisfied by a substituent selected from the group consisting of alkyl groups and aryl groups.

7. The process of claim 2 in which the organo-tin compound is selected from the group consisting of di- and tetra-valent organo metallic compounds of tin in which the several valences are satisfied by a substituent selected from the group consisting of alkyl groups and aryl groups.

8. The process of claim 3 in which the organo-tin compound is selected from the group consisting of di- and tetra-valent organo metallic compounds of tin in which the several valences are satisfied by a substituent selected from the group consisting of alkyl groups and aryl groups.

9. The process of claim 4 in which the organo-tin compound is selected from the group consisting of di- and tetra-valent organo metallic compounds of tin in which the several valences are satisfied by a substituent selected from the group consisting of alkyl groups and aryl groups.

10. The process of claim 5 in which the organo-tin compound is selected from the group consisting of di- and tetra-valent organo metallic compounds of tin in which the several valences are satisfied by a substituent selected from the group consisting of alkyl groups and aryl groups.

11. The process of claim 1 wherein said organo-tin compound is dibutyl tin oxide.

12. The process of claim 1 wherein said organo-tin compound is dibutyl diphenyl tin.

13. The process of claim 1 wherein said organo-tin compound is dibutyl tin diacetate.

14. The process of claim 1 wherein said compound is stannous oxalate.

15. The process of claim 1 wherein said dicarboxylic acid or said aromatic diamine is present in a molar excess of up to 10 mole percent.

16. The process of claim 1 wherein the organo-metallic tin compound contains at least one carboxylate salt bond.

References Cited

UNITED STATES PATENTS

| | | | |
|---|---|---|---|
| 3,189,575 | 6/1965 | Horn et al. | 260—45.75 |
| 3,067,168 | 12/1962 | Purdon | 260—45.75 |
| 2,244,192 | 6/1941 | Flory | 260—78 |

DONALD E. CZAJA, *Primary Examiner.*

J. A. SEIDLECK, *Examiner.*

C. W. IVY, *Assistant Examiner.*

Washington, D.C. 20231

UNITED STATES PATENT OFFICE
CERTIFICATE OF CORRECTION

Patent No. 3,408,334　　　　　　　　　　　　　　　　October 29, 1968

John R. Caldwell et al.

It is certified that error appears in the above identified patent and that said Letters Patent are hereby corrected as shown below:

Column 13, line 5, after "said" insert -- organo-tin --.

Signed and sealed this 3rd day of March 1970.

(SEAL)
Attest:

Edward M. Fletcher, Jr.　　　　　　　　　　WILLIAM E. SCHUYLER, JR.
　　　　　　　　　　　　　　　　　　　　　　　Commissioner of Patents